(12) United States Patent
Ishibashi et al.

(10) Patent No.: US 11,295,702 B2
(45) Date of Patent: Apr. 5, 2022

(54) HEAD-UP DISPLAY DEVICE AND DISPLAY CONTROL METHOD

(71) Applicant: Yazaki Corporation, Tokyo (JP)

(72) Inventors: Atsushi Ishibashi, Shizuoka (JP); Kazuyoshi Ogasawara, Shizuoka (JP); Akihiro Yoshida, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/877,482

(22) Filed: Jan. 23, 2018

(65) Prior Publication Data

US 2018/0211635 A1 Jul. 26, 2018

(30) Foreign Application Priority Data

Jan. 25, 2017 (JP) .............................. JP2017-011496

(51) Int. Cl.
| | |
|---|---|
| *G09G 5/10* | (2006.01) |
| *G06T 11/60* | (2006.01) |
| *G02B 27/01* | (2006.01) |
| *B60K 35/00* | (2006.01) |
| *G09G 3/00* | (2006.01) |
| *G06T 11/00* | (2006.01) |

(52) U.S. Cl.
CPC .............. *G09G 5/10* (2013.01); *B60K 35/00* (2013.01); *G02B 27/0101* (2013.01); *G06T 11/00* (2013.01); *G06T 11/60* (2013.01); *G09G 3/001* (2013.01); *B60K 2370/1529* (2019.05); *B60K 2370/191* (2019.05); *B60K 2370/193* (2019.05); *B60K 2370/33* (2019.05); *B60K 2370/331* (2019.05); *B60K 2370/334* (2019.05); *B60K 2370/347* (2019.05); *G02B 2027/0118* (2013.01); *G02B 2027/0138* (2013.01); *G09G 2320/0626* (2013.01); *G09G 2320/0686* (2013.01); *G09G 2354/00* (2013.01); *G09G 2360/144* (2013.01); *G09G 2380/10* (2013.01)

(58) Field of Classification Search
CPC ..... G09G 5/10; G02B 27/0101; G06T 19/006
See application file for complete search history.

(56) References Cited

U.S. PATENT DOCUMENTS 9,596,455 B2    3/2017  Izawa et al.
9,805,508 B1 *  10/2017 Jagmag ................. G06T 19/006
(Continued)

FOREIGN PATENT DOCUMENTS

| CN | 101710429 A | 5/2010 |
|---|---|---|
| CN | 104205825 A | 12/2014 |

(Continued)

*Primary Examiner* — Yi Yang
(74) *Attorney, Agent, or Firm* — Sughrue Mion, PLLC (57) ABSTRACT

A head-up display device includes: a reflection member disposed in front of a driver who drives a vehicle; a projection unit configured to project light toward the reflection member and display a virtual image in a region superimposed on a superimposing display target when viewed by the driver; and an imaging unit configured to take an image of a region in front of the vehicle to generate a front image that is an image of the region in front of the vehicle. The projection unit adjusts a luminance distribution of a virtual image in accordance with a luminance distribution of a region of the superimposing display target in the front image.

9 Claims, 10 Drawing Sheets

(56) References Cited

U.S. PATENT DOCUMENTS

| | | | |
|---|---|---|---|
| 9,874,746 B2 | 1/2018 | Matsubara et al. | |
| 2003/0169213 A1* | 9/2003 | Spero | G02B 5/20 345/7 |
| 2008/0024623 A1* | 1/2008 | Seo | H04N 5/235 348/229.1 |
| 2010/0067118 A1* | 3/2010 | Takahashi | G02B 27/01 359/633 |
| 2012/0050322 A1* | 3/2012 | Sato | H04N 13/111 345/630 |
| 2014/0307117 A1* | 10/2014 | Feng | H04N 5/2355 348/218.1 |
| 2015/0009294 A1* | 1/2015 | Izawa | H04N 13/207 348/46 |
| 2015/0183373 A1 | 7/2015 | Hayasaka et al. | |
| 2015/0237243 A1* | 8/2015 | Suzuki | H04N 5/2354 348/140 |
| 2016/0004076 A1* | 1/2016 | Matsubara | G02B 27/0101 345/7 |
| 2016/0025973 A1* | 1/2016 | Guttag | B60K 35/00 345/7 |
| 2016/0350974 A1* | 12/2016 | Hashimoto | B60R 1/00 |

FOREIGN PATENT DOCUMENTS

| | | |
|---|---|---|
| CN | 105008170 A | 10/2015 |
| DE | 10 2008 048 778 A1 | 4/2010 |
| EP | 2 894 620 A1 | 7/2015 |
| JP | 2-227340 A | 9/1990 |
| JP | 2013-174667 A | 9/2013 |
| JP | 2016-097818 A | 5/2016 |

\* cited by examiner

FIG.14

HEAD-UP DISPLAY DEVICE AND DISPLAY CONTROL METHOD

CROSS-REFERENCE TO RELATED APPLICATION(S)

The present application claims priority to and incorporates by reference the entire contents of Japanese Patent Application No. 2017-011496 filed in Japan on Jan. 25, 2017.

BACKGROUND OF THE INVENTION

1. Field of the Invention

The present invention relates to a head-up display device and a display control method.

2. Description of the Related Art

Head-up display devices have been known. Japanese Patent Application Laid-open No. 2016-97818 discloses a technology for a head-up display device configured to apply display light emitted from an indicator to a windshield and cause a driver to view the display light while superimposing the display light on an actual scene. In the head-up display device in Japanese Patent Application Laid-open No. 2016-97818, when there is an obstacle affecting the display by the head-up display device, such as external light and luminous objects, the luminance of a site corresponding to the range affecting the display is set higher than normal display luminance.

There is still room for improvement in adjustment of luminance of a virtual image. Increasing the luminance of the virtual image can enhance the visibility of the virtual image. However, if the luminance of the virtual image is too high, the virtual image becomes too conspicuous with respect to the background, which may make a driver feel distracted by the virtual image.

SUMMARY OF THE INVENTION

It is an object of the present invention to provide a head-up display device and a display control method capable of appropriately adjusting luminance of a virtual image.

A head-up display device according to one aspect of the present invention includes a reflection member disposed in front of a driver who drives a vehicle; a projection unit configured to project light toward the reflection member and display a virtual image in a region superimposed on a superimposing display target when viewed from the driver; and an imaging unit configured to take an image of a region in front of the vehicle to generate a front image that is an image of the region in front of the vehicle, wherein the projection unit adjusts a luminance distribution of the virtual image in accordance with a luminance distribution of a region of the superimposing display target in the front image.

According to another aspect of the present invention, in the head-up display device, it is preferable that when a portion with low luminance is present in a region of the superimposing display target, the projection unit decreases luminance of a portion in the virtual image that corresponds to the portion with low luminance.

According to still another aspect of the present invention, in the head-up display device, it is preferable that a region of the superimposing display target is divided into a plurality of divided regions, and the projection unit adjusts luminance of a portion in the virtual image that corresponds to the divided region in accordance with a luminance value of the divided region.

According to still another aspect of the present invention, it is preferable that the head-up display device includes a calculation unit configured to calculate a parallax between a viewpoint position of the driver and a position of the imaging unit, wherein a size of the divided region is changed in accordance with a size of the parallax.

According to still another aspect of the present invention, in the head-up display device, it is preferable that the superimposing display target is a detection target in front of the vehicle that is detected by a detection unit.

According to still another aspect of the present invention, in the head-up display device, it is preferable that the detection target is a mobile object in front of the vehicle, and the virtual image displayed by the projection unit is a frame surrounding the mobile object.

A display control method according to still another aspect of the present invention includes an acquisition step of acquiring a front image that is an image of a region in front of a vehicle; and a projection step of projecting light toward a reflection member disposed in front of a driver who drives the vehicle, and displaying a virtual image in a region superimposed on a superimposing display target when viewed from the driver, wherein in the projecting step, a luminance distribution of the virtual image is adjusted in accordance with a luminance distribution of a region of the superimposing display target in the front image.

According to still another aspect of the present invention, in the display control method, it is preferable that in the projecting step, when a portion with low luminance is present in the front image, luminance of a portion in the virtual image that corresponds to the portion with low luminance is decreased.

According to still another aspect of the present invention, in the display control method, it is preferable that a region of the superimposing display target is divided into a plurality of divided regions, and in the projecting step, luminance of a portion in the virtual image that corresponds to a divided region is adjusted in accordance with a luminance value of the divided region.

According to still another aspect of the present invention, in the display control method, it is preferable that a size of the divided region is changed in accordance with a size of a parallax between a viewpoint position of the driver and a position of an imaging unit configured to take the front image.

According to still another aspect of the present invention, in the display control method, it is preferable that the superimposing display target is a detection target in front of the vehicle that is detected by a detection unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Now, a head-up display device and a display control method according to an embodiment of the present invention are described in detail with reference to the drawings. Note that the present invention is not limited by the embodiment. Components in the following embodiment include components that can be easily conceived by a person skilled in the art and components that are substantially the same.

Embodiment

Figure 1:
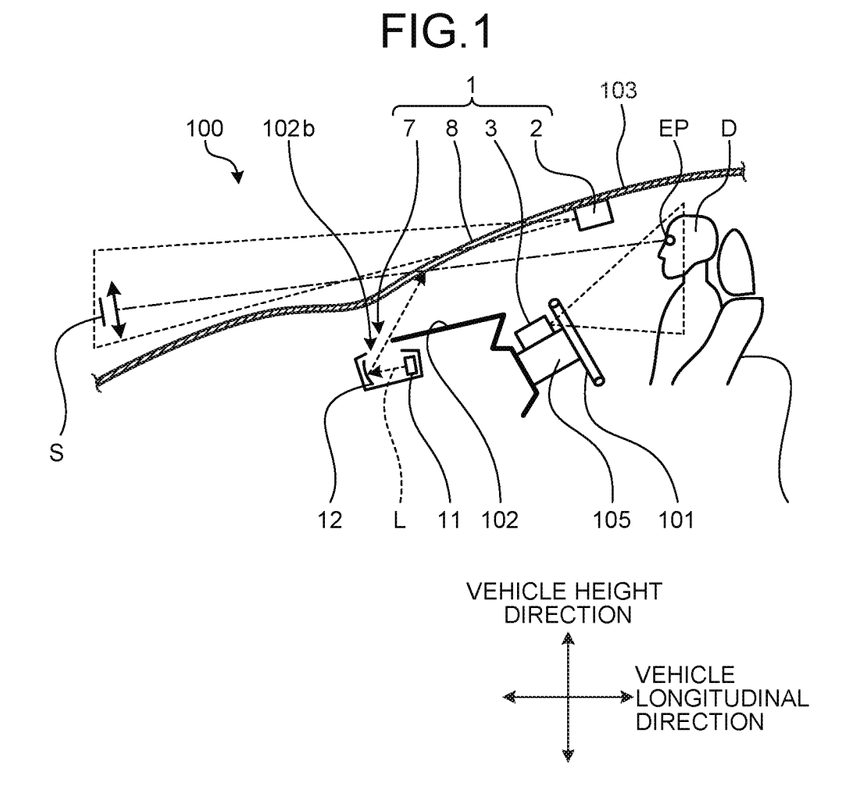
FIG. 1 is a schematic configuration diagram of a head-up display device according to an embodiment.
Figure 2:
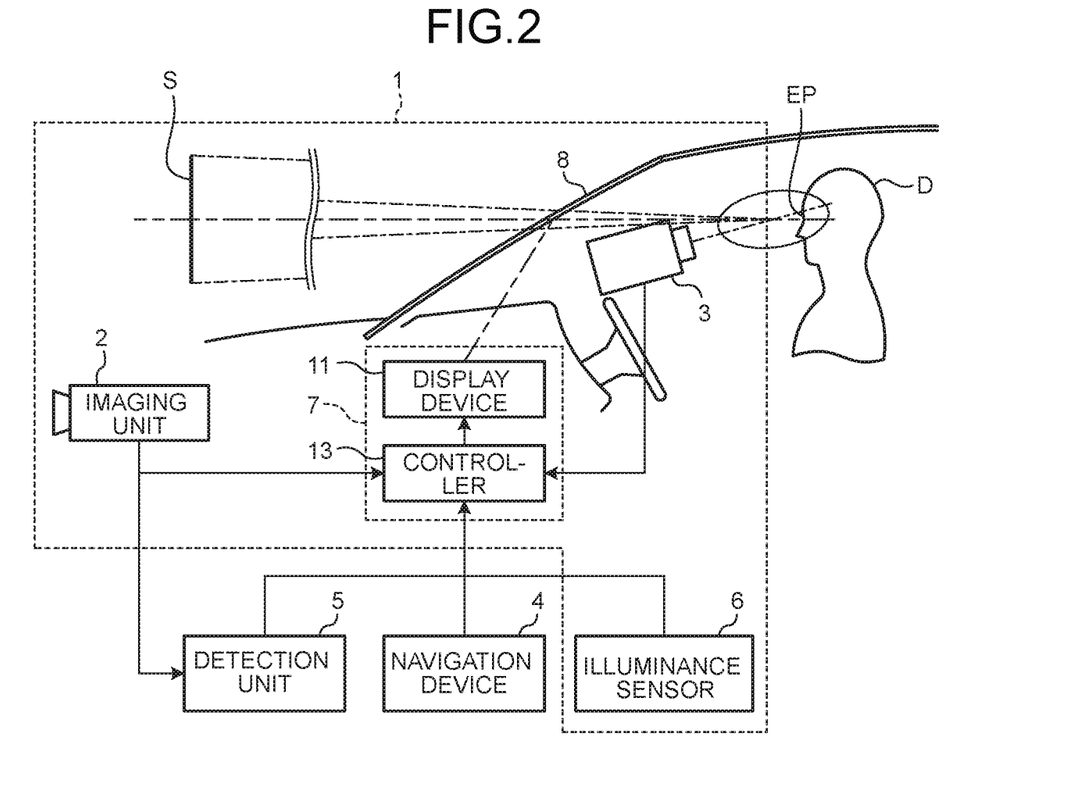
FIG. 2 is a block diagram of the head-up display device according to the embodiment.
Figure 3:
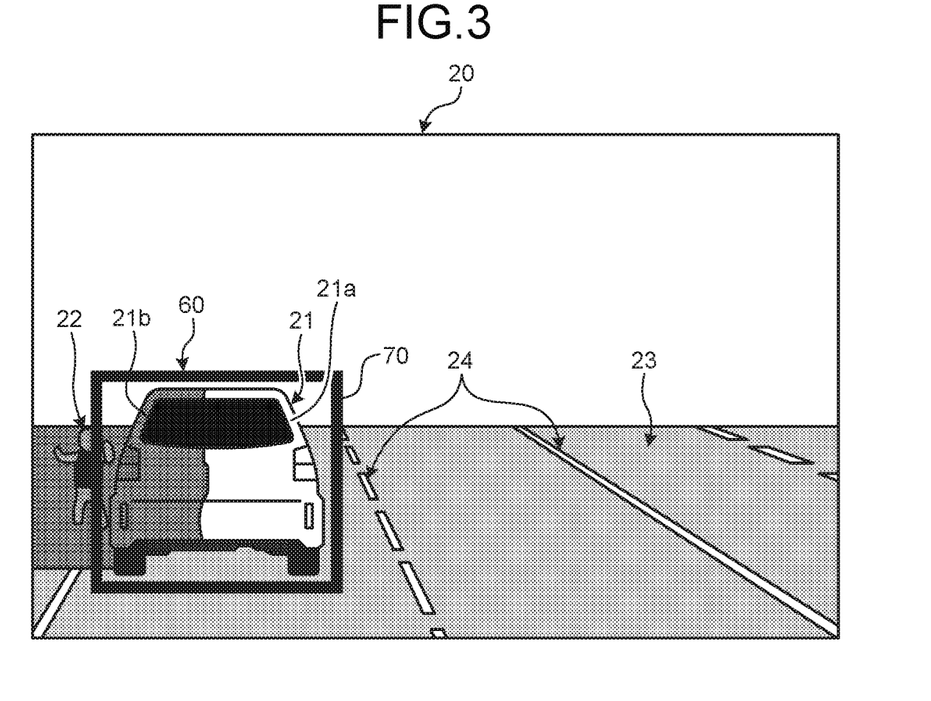
FIG. 3 is a diagram illustrating an example of a virtual image displayed while being superimposed on the foreground.
Figure 4:
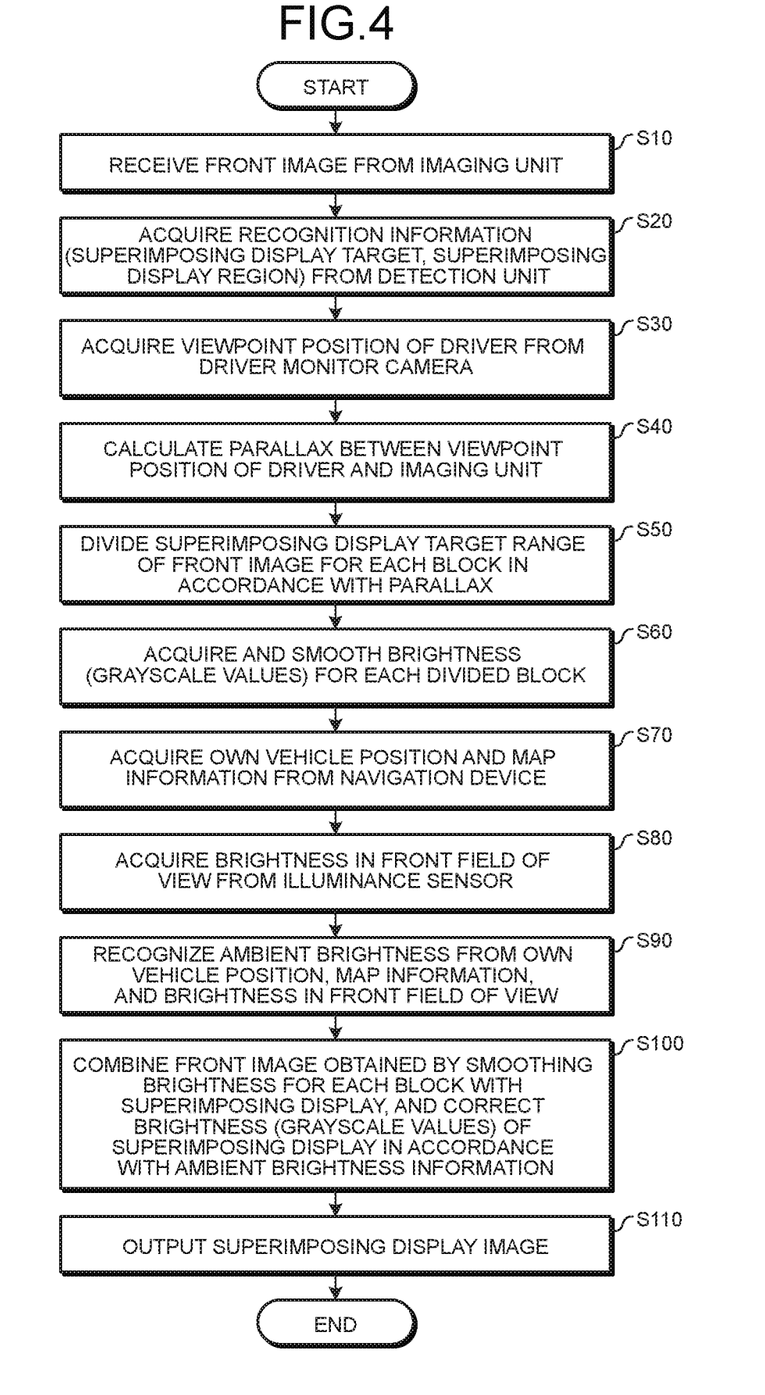
FIG. 4 is a flowchart illustrating an operation of the head-up display device according to the embodiment.
Figure 5:
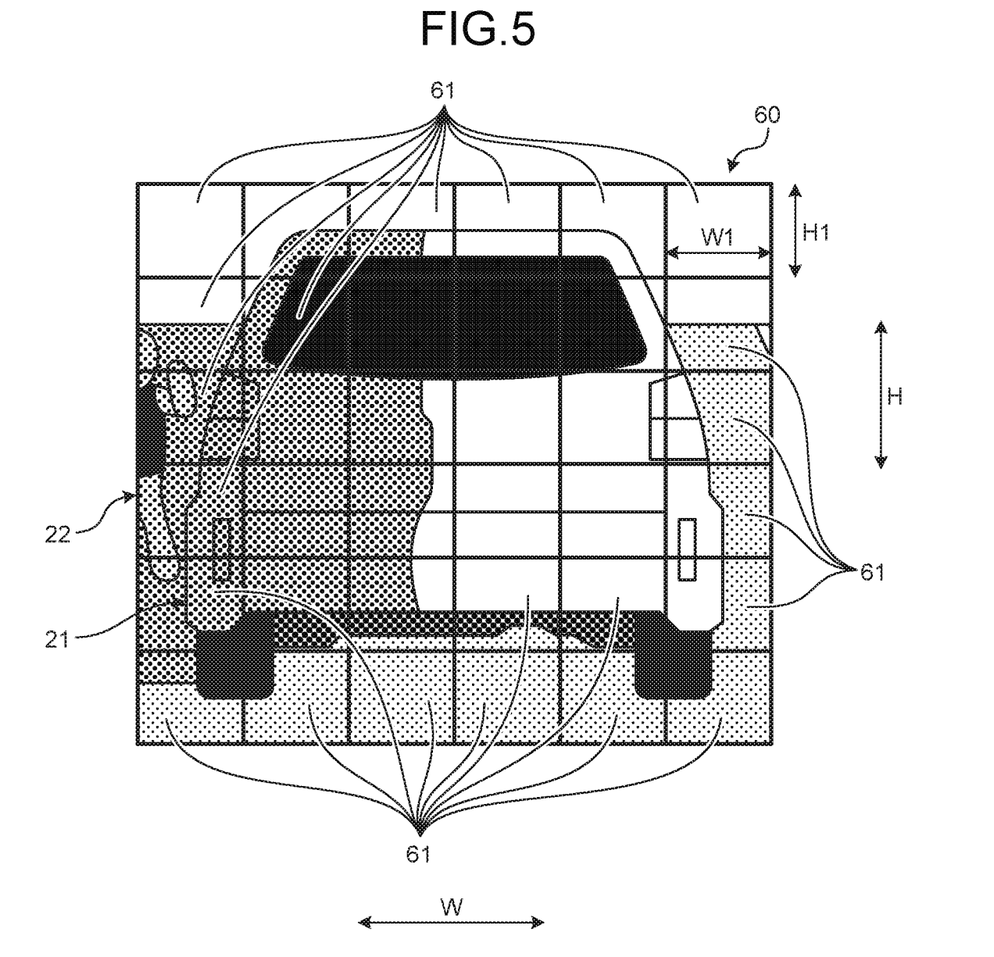
FIG. 5 is a diagram illustrating a target region and divided regions according to the embodiment.
Figure 6:
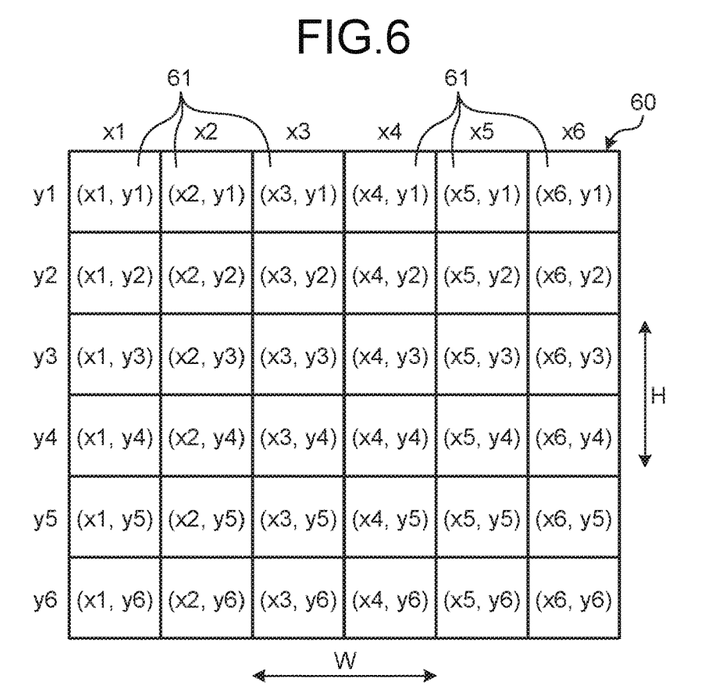
FIG. 6 is an explanatory diagram of the divided regions according to the embodiment.
Figure 7:
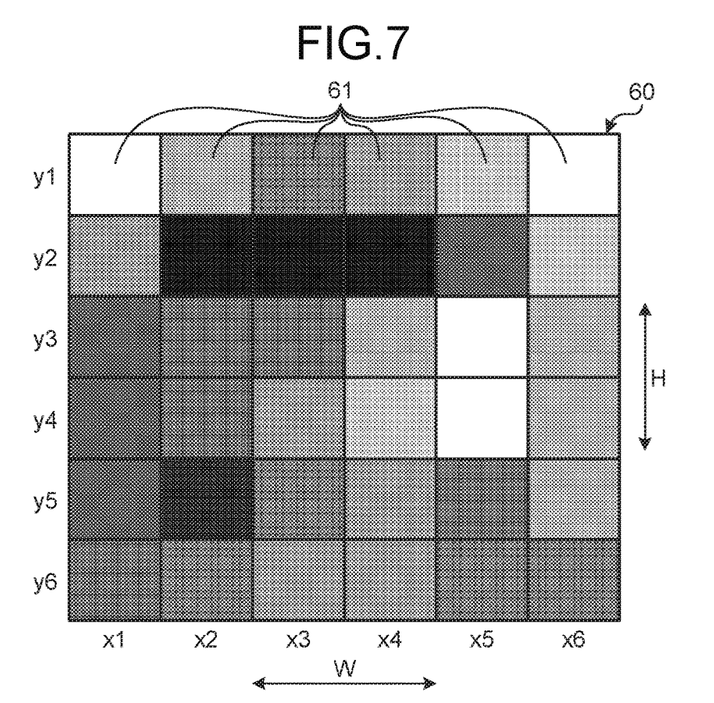
FIG. 7 is a diagram illustrating a map of representative luminance values.
Figure 8:
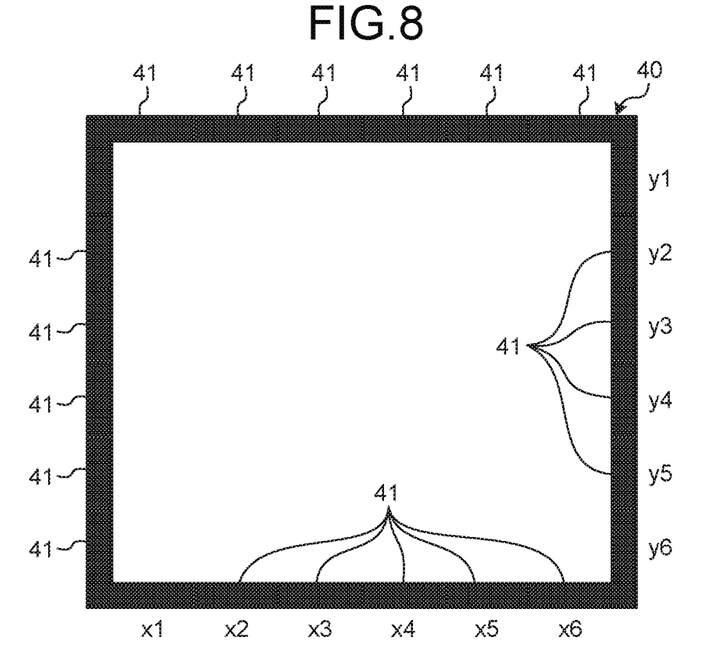
FIG. 8 is a diagram illustrating a luminance distribution of a frame before correction.
Figure 9:
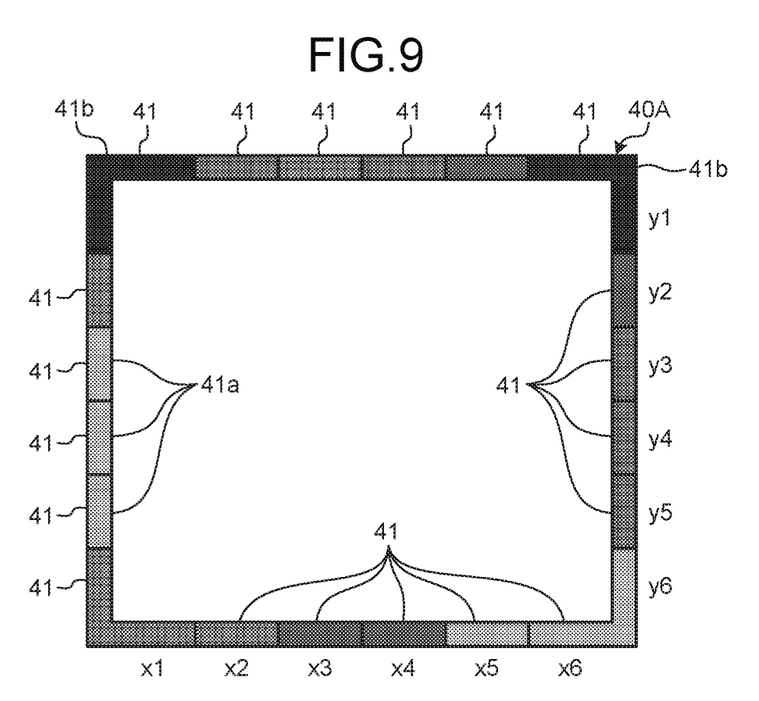
FIG. 9 is a diagram illustrating a luminance distribution of the frame after correction.
Figure 10:
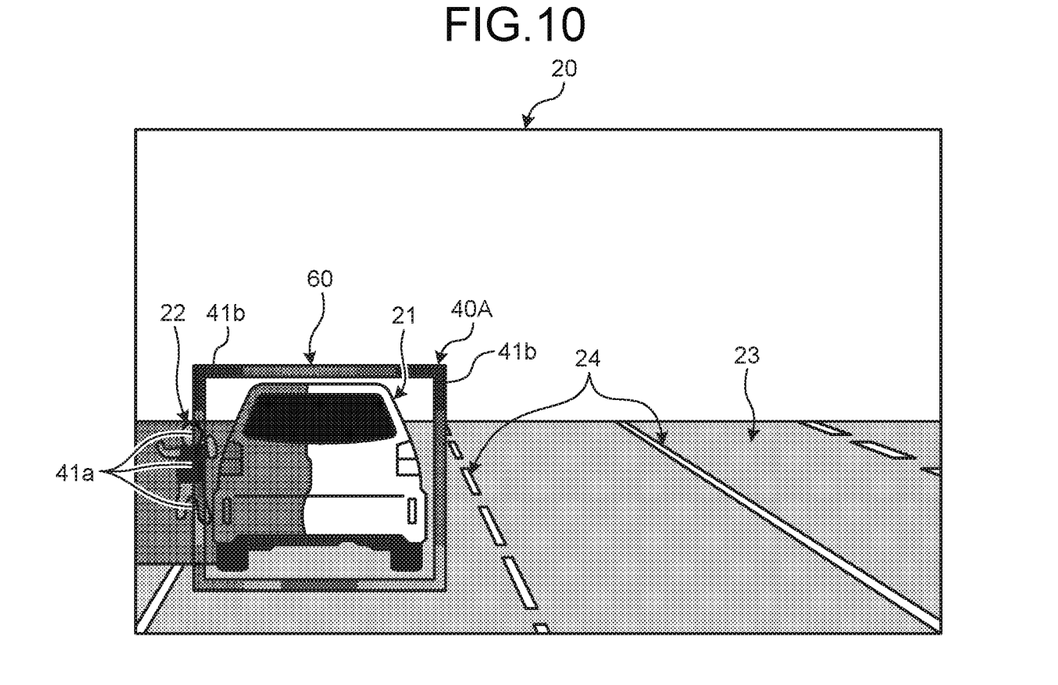
FIG. 10 is a diagram illustrating the frame after luminance correction displayed while being superimposed on the foreground.

Referring to FIG. 1 to FIG. 10, the embodiment is described. The present embodiment relates to a head-up display device and a display control method. FIG. 1 is a schematic configuration diagram of the head-up display device according to the embodiment. FIG. 2 is a block diagram of the head-up display device according to the embodiment. FIG. 3 is a diagram illustrating an example of a virtual image displayed while being superimposed on the foreground. FIG. 4 is a flowchart illustrating an operation of the head-up display device according to the embodiment. FIG. 5 is a diagram illustrating a target region and divided regions according to the embodiment. FIG. 6 is an explanatory diagram of the divided regions according to the embodiment. FIG. 7 is a diagram illustrating a map of representative luminance values. FIG. 8 is a diagram illustrating a luminance distribution of a frame before correction. FIG. 9 is a diagram illustrating a luminance distribution of the frame after correction. FIG. 10 is a diagram illustrating the frame after luminance correction displayed while being superimposed on the foreground.

As illustrated in FIG. 1 and FIG. 2, a head-up display device 1 according to the embodiment includes an imaging unit 2, a driver monitor camera 3, an illuminance sensor 6, a projection unit 7, and a windshield 8.

The head-up display device 1 is mounted on a vehicle 100. The windshield 8 is disposed in front of a driver D in the vehicle 100. The windshield 8 is a reflection member configured to reflect a part of light projected from the projection unit 7. The windshield 8 may be coated with a semi-transmissive coating for reflecting a part of incident light and transmitting a part of the light.

The projection unit 7 projects light toward the windshield 8 to display a virtual image S in front of the driver D. The projection unit 7 in the present embodiment displays the virtual image S in a region that overlaps with a superimposing display target described later when viewed by the driver D. The projection unit 7 is housed in a housing unit covered with an instrument panel 102. An opening 102b is provided in the top surface of the instrument panel 102. The projection unit 7 projects light toward the windshield 8 through the opening 102b.

The projection unit 7 in the present embodiment includes a display device 11 and a mirror 12. The display device 11 displays the virtual image S so as to be superimposed on a scene in the front visual field on the basis of information from a controller 13 described later. The display device 11 in the present embodiment is a liquid crystal display device, such as a thin film transistor-liquid crystal display (TFT-LCD). The display device 11 includes a liquid crystal display unit and a backlight. The liquid crystal display unit displays desired images, for example, color images. The backlight applies light from the back surface side of the liquid crystal display unit, and projects an image displayed on the liquid crystal display unit toward the mirror 12. The mirror 12 reflects the image projected from the display device 11 toward the windshield 8. The image projected from the mirror 12 is reflected by the windshield 8 toward the driver D. When viewed by the driver D, the image reflected by the windshield 8 is formed as the virtual image S at a position ahead of the vehicle with respect to the windshield 8.

The imaging unit 2 takes an image of a region in front of the vehicle 100 to generate a front image 20 (see FIG. 3) that is an image of the front. The imaging unit 2 in the present embodiment is disposed in the interior of the vehicle 100. For example, the imaging unit 2 is disposed on the ceiling 103 of the vehicle 100. The imaging unit 2 may be provided to a rearview mirror disposed on the ceiling 103. The imaging unit 2 takes an image of the region in front of the vehicle 100 through the windshield 8.

The driver monitor camera 3 takes an image of the driver D. The driver monitor camera 3 is disposed in front of the driver D in the interior of the vehicle 100. The driver monitor camera 3 in the present embodiment is disposed on top of a steering column 105 and behind a steering wheel 101 when viewed by the driver D. The driver monitor camera 3 is installed to be capable of taking an image of at least a viewpoint position EP of the driver D. For example, the imaging range of the driver monitor camera 3 is determined such that the driver monitor camera 3 can take an image of the upper body including the head of the driver D.

A navigation device 4 illustrated in FIG. 2 is a device configured to provide an own vehicle position of the vehicle 100 and detailed peripheral map information. The navigation device 4 acquires the own vehicle position on the basis of information from satellites of the global positioning system (GPS). The navigation device 4 acquires information on tunnels and grade-separated crossings from map information stored in advance and through communications.

A detection unit 5 detects a superimposing display target in front of the vehicle 100. The superimposing display target is a target on which the virtual image S is to be superimposed. The projection unit 7 determines a display position of the virtual image S such that the virtual image S is superimposed on the superimposing display target when viewed by the driver D. The detection unit 5 in the present embodiment is an advanced driver assistance system. The detection unit 5 detects a superimposing display target, such as an object and a road surface, from the imaging unit 2 and various kinds of sensors. The superimposing display target in the present embodiment is a target to which attention is paid by the driver D, such as a mobile object in front of the vehicle 100, a road surface in front of the vehicle 100, and a structure in front of the vehicle 100. In the present embodiment, a mobile object in front of the vehicle 100 is detected as a superimposing display target. The head-up display device 1 in the present embodiment sets a detection target detected by the detection unit 5 as a superimposing display target. Note that mobile objects to be detected include all kinds of vehicles including two-wheeled vehicles, and pedestrians.

The illuminance sensor 6 is a device configured to detect the brightness in a front field of view. For example, the illuminance sensor 6 is disposed on the top surface of the instrument panel 102. The illuminance sensor 6 is installed at a position at which light entering the interior of the vehicle through the windshield 8 can be detected.

The projection unit 7 includes the above-mentioned display device 11 and the controller 13. The controller 13 is a superimposing rendering device, and is a device configured to generate instructions for images and videos to be displayed on the display device 11. The controller 13 may be a part of the display device 11. For example, the controller 13 is a computer including an arithmetic unit, a storage unit, and an interface unit. The controller 13 is communicably connected to each of the imaging unit 2, the driver monitor camera 3, the navigation device 4, the detection unit 5, and the illuminance sensor 6. The controller 13 acquires a front image generated by the imaging unit 2 from the imaging unit 2.

The controller 13 acquires viewpoint information on the driver D from the driver monitor camera 3. The driver monitor camera 3 detects a viewpoint position EP of the driver D from the taken image of the driver D (hereinafter referred to simply as "driver image"). The viewpoint position EP is calculated as a coordinate position at coordinates set to the vehicle 100. The viewpoint position EP includes a position in a vehicle width direction and a position in a vehicle height direction, and may further include a position in a vehicle longitudinal direction. Note that the calculation of the viewpoint position EP may be performed by the controller 13.

The controller 13 acquires the current position of the vehicle 100 and map information from the navigation device 4. The map information to be acquired is information on structures affecting the brightness of the foreground among structures located on the road ahead where the vehicle 100 is currently travelling. More specifically, the controller 13 acquires positional information on a site ahead of the vehicle 100 in the travel direction where the brightness of the foreground changes, such as a tunnel, from the navigation device 4.

The controller 13 acquires information on a detection target detected by the detection unit 5 from the detection unit 5. The detection unit 5 in the present embodiment is connected to the imaging unit 2, and acquires a front image 20 from the imaging unit 2. The detection unit 5 in the present embodiment detects on the basis of the front image 20, the detection target present in front of the vehicle 100. Examples of a method of detecting the detection target include pattern matching. The detection unit 5 can calculate a relative position of the detected detection target with respect to the vehicle 100. Note that the detection unit 5 may calculate the above-mentioned relative position on the basis of radar information in addition to the front image 20 or in place of the front image 20.

The detection unit 5 determines a target region 60, which is an image region including the detection target, in the front image 20. FIG. 3 illustrates an example of the target region 60. In the present embodiment, the detection target detected by the detection unit 5 is another vehicle 21. The other vehicle 21 is located on a road in front of the vehicle 100 and is standing still on the road. The detection unit 5 further detects a road surface 23 and white lines 24 in the front image 20. The detection unit 5 can estimate the shape and gradient of the road ahead on the basis of the detected road surface 23 and white lines 24. The detection unit 5 can calculate the position of the other vehicle 21 on the road and the travel speed of the other vehicle 21 on the basis of the detected road surface 23 and white lines 24.

The target region 60 in the present embodiment is a rectangular image region including the detected other vehicle 21, for example, a square image region. The detection unit 5 determines the target region 60 by adding predetermined margins to the other vehicle 21 in an image vertical direction and an image horizontal direction. Note that the determination of the target region 60, the detection of the road surface 23 and the white lines 24, and the estimation of the shape and gradient of the road may be performed by the controller 13 in place of the detection unit 5. The head-up display device 1 recognizes the determined target region 60 as a region of the superimposing display target for the virtual image S.

The head-up display device 1 in the present embodiment displays a frame of the virtual image in a region that is superimposed on the superimposing display target when viewed by the driver D. The frame is displayed around the superimposing display target so as to surround the superimposing display target. For example, the frame surrounding the superimposing display target is a rectangular frame 70 as illustrated in FIG. 3. Displaying the frame 70 of the virtual image around the other vehicle 21 can draw the attention of the driver to the other vehicle 21.

A person 22 is present near the other vehicle 21. Examples of the person 22 include an occupant who is getting in or out of the other vehicle 21 and a pedestrian who is walking on the side of the other vehicle 21. The person 22 is located in an area shaded by the other vehicle 21. Thus, the person 22 is less conspicuous than a portion 21a of the vehicle 21 that receives light. In such a situation, if the frame 70 is displayed while being superimposed on the person 22, the driver D may be distracted by the frame 70. If the luminance of a portion of the frame 70 adjacent to the portion 21b shaded by the other vehicle 21 is much higher than the luminance of the portion 21b, the frame 70 becomes too conspicuous for the driver D and the driver D may be distracted by the frame 70.

As described below, the head-up display device 1 in the present embodiment adjusts a luminance distribution of the virtual image S in accordance with a luminance distribution in the region of the superimposing display target in the front image 20. The projection unit 7 in the present embodiment decreases the luminance of the virtual image S superimposed on a dark background portion. Consequently, the head-up display device 1 in the present embodiment can set appropriate luminance of the virtual image S.

FIG. 4 is a flowchart illustrating the operation of the head-up display device 1 in the present embodiment. The flowchart in FIG. 4 illustrates a display control method according to the present embodiment. The controller 13 is programmed in advance to execute the display control method described below. At Step S10, the controller 13 receives a front image 20 from the imaging unit 2. The front image 20 is also transmitted to the detection unit 5. After Step S10 is executed, the flow proceeds to Step S20.

At Step S20, the controller 13 acquires recognition information from the detection unit 5. The recognition information acquired at Step S20 is at least one of information on a target on which the virtual image S is to be superimposed and displayed and information on a region in which the virtual image S is to be superimposed and displayed. For example, the controller 13 acquires information on a relative position of the detected other vehicle 21 with respect to the vehicle 100 as the information on the target on which the virtual image S is to be superimposed and displayed. For example, the controller 13 acquires coordinate information on the target region 60 as the information on the region in which the virtual image S is to be superimposed and displayed. For example, the coordinate information may be coordinate values of points at four corners of the target region 60.

In order to set a display position of the virtual image S, the controller 13 stores in advance a correspondence relation between the coordinate values in the front image 20 and pixel positions on the display device 11 corresponding to the coordinate values. Specifically, the controller 13 stores in advance which coordinate position in the front image 20 corresponds to a position at which light of each pixel of the display device 11 is superimposed when viewed by the driver D. For example, the correspondence relation is a correspondence relation obtained when a viewpoint position EP of the driver D is a predetermined standard position. After Step S20 is executed, the flow proceeds to Step S30.

At Step S30, the controller 13 acquires the viewpoint position EP of the driver D from the driver monitor camera 3. After Step S30 is executed, the flow proceeds to Step S40.

At Step S40, the controller 13 calculates a parallax between the viewpoint position EP of the driver D and the imaging unit 2. For example, the controller 13 calculates the parallax on the basis of the position of the imaging unit 2, the position of the other vehicle 21 acquired at Step S20, and the viewpoint position EP acquired at Step S30. After Step S40 is executed, the flow proceeds to Step S50.

At Step S50, the controller 13 divides the front image 20 in accordance with the parallax. As illustrated in FIG. 5, the controller 13 divides the target region 60 into a plurality of divided regions 61. The shape of each divided region 61 is rectangular. In the present embodiment, the shape of the divided regions 61 is square. As illustrated in FIG. 5, the target region 60 is equally divided into a plurality of columns along an image width direction W and equally divided into a plurality of rows along an image vertical direction H. In the present embodiment, a height H1 of the row is common to the rows, and a width W1 of the column is common to the columns. Note that, as described later, the division number by which the target region 60 is divided, in other words, the height H1 and the width W1 are different depending on the size of the parallax. After Step S50 is executed, the flow proceeds to Step S60.

At Step S60, the controller 13 acquires and smooths the brightness (grayscale values) for each divided block. As illustrated in FIG. 6, in the target region 60, the columns of the divided regions 61 (blocks) are referred to as a first column x1, a second column x2, . . . , and a sixth column x6. In the target region 60, the rows of the divided regions 61 are referred to as a first row y1, a second row y2, . . . , and a sixth row y6. The controller 13 calculates, for each of the divided regions 61 from the first row and the first column (x1,y1) to the sixth row and the sixth column (x6,y6), a representative value indicating the brightness of the divided region 61 (hereinafter referred to simply as "representative luminance value BR").

For example, the representative luminance value BR of the divided region 61 in the first row and the first column (x1,y1) is an average value obtained by averaging luminances of a plurality of pixels constituting the divided region 61 in the first row and the first column (x1,y1). The controller 13 calculates a representative luminance value BR in each divided region 61 in a similar manner. After Step S60 is executed, the flow proceeds to Step S70.

At Step S70, the controller 13 acquires the own vehicle position and map information from the navigation device 4. After Step S70 is executed, the flow proceeds to Step S80.

At Step S80, the controller 13 acquires the brightness in a front field of view from the illuminance sensor 6. The controller 13 acquires information indicating the detection result of illuminance from the illuminance sensor 6. After Step S80 is executed, the flow proceeds to Step S90.

At Step S90, the controller 13 recognizes ambient brightness. The controller 13 recognizes the ambient brightness on the basis of the own vehicle position and the map information acquired at Step S70 and the brightness in the front field of view acquired at Step S80. For example, the controller 13 calculates the ambient brightness from the illuminance acquired from the illuminance sensor 6. The controller 13 corrects the calculated ambient brightness on the basis of a relative position between a tunnel ahead of the vehicle 100 and the vehicle 100. As the distance from the vehicle 100 to the tunnel ahead of the vehicle 100 becomes shorter, the ambient brightness is corrected to a value on the darker side. Note that the ambient brightness is corrected on the basis of the relative position to the tunnel in the above description, but, for example, the brightness may be corrected to a given value when the distance to the tunnel approaches a given distance. After Step S90 is executed, the flow proceeds to Step S100.

At Step S100, the controller 13 combines the front image 20 obtained by smoothing the brightness for each block with a superimposing display. The controller 13 sets the luminance of each portion in the virtual image S to be displayed on the basis of the representative luminance value BR calculated at Step S60. The setting of the luminance is described with reference to FIG. 7 to FIG. 9. FIG. 7 illustrates a map of representative luminance values BR. The map is obtained by smoothing luminances of pixels in each divided region 61 to a representative luminance value BR. The map in FIG. 7 is a map of a luminance distribution in the target region 60. Density in each divided region 61 corresponds to the representative luminance value BR. The divided region 61 is displayed lighter as the representative luminance value BR becomes higher, and the divided region 61 is displayed darker as the representative luminance value BR becomes lower.

FIG. 8 illustrates a frame 40 before luminance is adjusted. The frame 40 is a virtual image S to be displayed while being superimposed in the region of the superimposing display target. The frame 40 is divided into a plurality of portions 41. A portion 41 in the first row and the first column (x1,y1) is a portion corresponding to the divided region 61 in the first row and the first column (x1,y1). In a similar manner, the frame 40 is divided into twenty portions 41 up to a portion 41 in the sixth row and the sixth column (x6,y6). Density in each portion 41 corresponds to a luminance value BT obtained when each portion 41 is projected. The portion 41 displayed dark is projected with high luminance, and the portion 41 displayed light is displayed with low luminance. In the frame 40 before the luminance values BT are adjusted, the luminance values BT of the portions 41, that is, the density of the portions 41 has a common value.

The controller 13 adjusts the luminance value BT of each portion 41 on the basis of the representative luminance value BR of a corresponding divided region 61. The adjustment of luminance is described by taking the portion 41 in the first row and the first column (x1,y1) as an example. The controller 13 adjusts a luminance value BT (x1,y1) of the portion 41 in the first row and the first column in accordance with a representative luminance value BR (x1,y1) of the divided region 61 in the first row and the first column. For example, the controller 13 corrects the luminance value BT (x1,y1) to a higher luminance side as the representative luminance value BR (x1,y1) has a luminance higher than a reference value. On the other hand, the controller 13 corrects the luminance value BT (x1,y1) to a lower luminance side as the representative luminance value BR (x1,y1) has a luminance lower than the reference value. The controller 13 corrects the luminance value BT of each portion 41 in a similar manner.

The controller 13 further corrects the luminance value BT in accordance with the ambient brightness recognized at Step S90. As the recognized ambient brightness has a value on the brighter side, the luminance value BT of each portion 41 is corrected to the higher luminance side. On the other hand, as the recognized ambient brightness has a value on the darker side, the luminance value BT of each portion 41 is corrected to the lower luminance side. FIG. 9 illustrates a frame 40A after the luminance values BT have been corrected. As understood from FIG. 9, in a portion 41 to be superimposed in the dark background, for example, a portion 41 denoted by symbol 41*a*, the corrected luminance value BT thereof has low luminance. On the other hand, in a portion to be superimposed in the bright background, for example, a portion 41 denoted by symbol 41*b*, the corrected luminance value BT thereof has high luminance. By correcting the luminance values BT of the portions 41, the luminance distribution of the frame 40A is adjusted. Note that the corrected luminance value BT may be any value of predetermined grayscale values in stages. For example, the final luminance value BT may be a value closest to a luminance value BT calculated on the basis of the representative luminance value BR or the ambient brightness among the grayscale values in stages. After Step S100 is executed, the flow proceeds to Step S110.

At Step S110, the controller 13 outputs a superimposing display image. The controller 13 controls the display device 11 to display the frame 40A illustrated in FIG. 9 in which the luminance has been corrected. The display device 11 generates an image of the frame 40A in which the luminance has been corrected, and projects the image toward the mirror 12. The image of the frame 40A projected from the display device 11 is reflected by the mirror 12 and the windshield 8 to be viewed by the driver D. As illustrated in FIG. 10, the frame 40A is viewed by the driver D as a virtual image that is superimposed in the target region 60 and surrounds the other vehicle 21 serving as the superimposing display target. After Step S110 is executed, this control flow is finished.

In the present embodiment, as illustrated in FIG. 10, in the frame 40A, the portions 41*a* superimposed in the region shaded by the other vehicle 21 are displayed with low luminance. Thus, the driver D can more easily recognize the person 22 in the shaded region. In the frame 40A, the portions 41*b* superimposed in the bright background are displayed with high luminance. Thus, the driver D can clearly view the portions 41*b* superimposed in the bright background. In this manner, the head-up display device 1 in the present embodiment can display the frame 40A (virtual image S) having appropriate luminance in the region superimposed on the superimposing display target.

The head-up display device 1 in the present embodiment changes the size of the divided region 61 in accordance with the size of a parallax between the viewpoint position EP of the driver D and the position of the imaging unit 2. For example, when the parallax is large, the controller 13 increases the size of the divided region 61 to be larger than that when the parallax is small. When the parallax is large, a difference is more likely to occur between the brightness at the position of the target viewed by the driver D and the brightness of a pixel corresponding to the position of the target in the front image 20. It is considered that by increasing the size of the divided region 61 when the parallax is large, the influence of the above-mentioned difference is absorbed and reduced.

When the parallax is small, the size of the divided region 61 may be decreased. When the parallax is small, the above-mentioned difference is less likely to occur. By dividing the target region 60 into small divided regions 61, the luminance values BT can be corrected more finely.

As described above, the head-up display device 1 according to the present embodiment includes the windshield 8, the projection unit 7, and the imaging unit 2. The windshield 8 is a reflection member disposed in front of the driver D. The projection unit 7 projects light toward the windshield 8, and displays a virtual image S in a region superimposed on a superimposing display target when viewed by the driver D. The virtual image S in the present embodiment is the frame 40A. The imaging unit 2 takes an image of the region in front of the vehicle 100 to generate the front image 20.

The projection unit 7 adjusts a luminance distribution of the virtual image S in accordance with a luminance distribution in the target region 60 in the front image 20. The target region 60 is a region of the superimposing display target in the front image 20. The region of the superimposing display target is a region in which the superimposing display target is imaged, and is determined so as to include the superimposing display target. The head-up display device 1 in the present embodiment can display the virtual image S with appropriate luminance by adjusting the luminance distribution of the virtual image S in accordance with the luminance distribution in the target region 60.

When a portion with low luminance is present in the target region 60, the projection unit 7 in the present embodiment decreases luminance of the portion 41*a* in the virtual image S that corresponds to the portion with low luminance. When the luminance distribution of the virtual image S is adjusted in this manner, the driver D can more easily view the dark background. As a result, the driver D feels less distracted by the displayed virtual image S. Furthermore, the virtual image S less hinders the driver D from visually recognizing objects and the road surface 23 in front of the vehicle.

The projection unit 7 in the present embodiment adjusts the luminance of a portion in the virtual image S that is to be superimposed on the bright background to the high luminance side. Because the virtual image S in the portion superimposed on the bright background is displayed with high luminance, the visibility of the virtual image S is enhanced. Consequently, the virtual image S according to the present embodiment enables the driver D to appropriately recognize the presence of the superimposing display target. In this manner, the head-up display device 1 in the present embodiment can achieve the display that does not impair the superimposing function. The head-up display device 1 in the present embodiment enables the driver D to more easily view objects and the road surface 23 in a front field of view by adjusting the luminance distribution of the virtual image S.

In the head-up display device 1 in the present embodiment, the target region 60 is divided into a plurality of divided regions 61. The projection unit 7 adjusts the luminance of a portion of the virtual image S that is to be superimposed in the divided region 61 in accordance with the representative luminance value BR of the divided region 61. Consequently, when the brightness is uneven in the target region 60, the luminance distribution of the virtual image S can be appropriately adjusted. In the present embodiment, an average value of luminances of pixels in the divided region 61 is calculated as the representative luminance value BR. By using the average value in this manner, a parallax between the viewpoint position EP and the position of the imaging unit 2 is absorbed. The luminance distribution of the virtual image S can be adjusted while gradually responding to the brightness in the front field of view, which changes dynamically along with the travel of the vehicle 100.

The head-up display device 1 in the present embodiment further includes a calculation unit for calculating a parallax between the viewpoint position EP of the driver D and the position of the imaging unit 2. The controller 13 in the present embodiment stores a computer program that functions as the calculation unit. The controller 13 changes the size of the divided region 61 in accordance with the size of the parallax. As the parallax becomes larger, the degree of match between the foreground viewed by the driver D and the front image 20 generated by the imaging unit 2 is more likely to be reduced. By increasing or decreasing the size of the divided region 61 in accordance with the size of the parallax, the luminance distribution of the virtual image S is appropriately adjusted.

In the head-up display device 1 in the present embodiment, the superimposing display target is a detection target in front of the vehicle that is detected by the detection unit 5. The head-up display device 1 in the present embodiment can superimpose and display the virtual image S having luminance suited for the detection target.

In the head-up display device 1 in the present embodiment, the detection target (superimposing display target) is a mobile object in front of the vehicle 100. The virtual image S displayed by the projection unit 7 is a frame 40A surrounding the mobile object. In the displayed frame 40A, a portion 41b adjacent to a region where the mobile object is bright is displayed with high luminance, and a portion 41a adjacent to a region where the mobile object is dark is displayed with low luminance. Consequently, the frame 40A is displayed with a contrast suited for the mobile object.

The display control method in the present embodiment includes an acquisition step (Step S10) and a projection step (Step S110). At the acquisition step, the controller 13 acquires a front image that is an image of a region in front of the vehicle 100. At the projection step, the projection unit 7 projects light toward the windshield 8, and displays a virtual image S in a region superimposed on a superimposing display target when viewed by the driver D. At the projection step, the projection unit 7 adjusts a luminance distribution of the virtual image S in accordance with a luminance distribution in a region (target region 60) of the superimposing display target in the front image 20. Consequently, the display control method in the present embodiment can display the virtual image S with appropriate luminance.

In the display control method in the present embodiment, when a portion with low luminance is present in the target region 60, luminance of a portion in the virtual image S that corresponds to the portion with low luminance is decreased at the projection step. Consequently, the driver D feels less distracted by the displayed virtual image S.

In the display control method in the present embodiment, the target region 60 is divided into a plurality of divided regions 61. At the projection step, the projection unit 7 adjusts luminance of a portion in the virtual image S that corresponds to the divided region 61 in accordance with a luminance value of the divided region 61. Consequently, when the brightness is uneven in the target region 60, the luminance distribution of the virtual image S can be appropriately adjusted.

In the display control method in the present embodiment, the size of the divided region 61 may change in accordance with a parallax between the viewpoint position EP of the driver D and the position of the imaging unit 2. The superimposing display target may be a detection target in front of the vehicle that is detected by the detection unit 5.

First Modification of Embodiment

Figure 11:
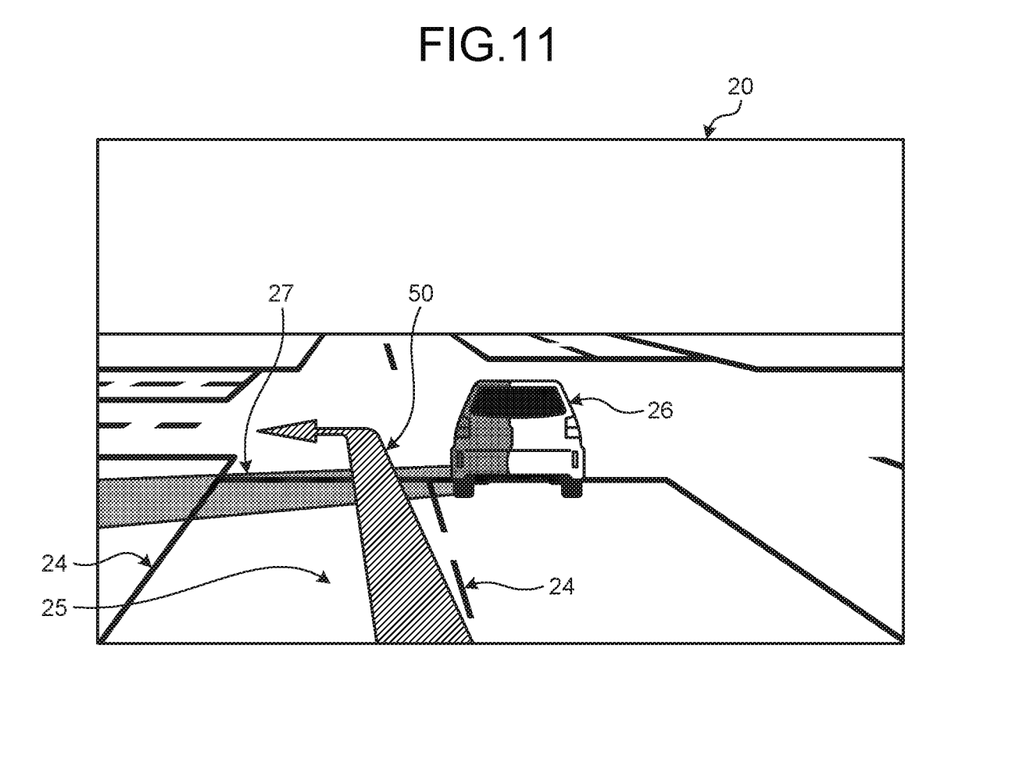
FIG. 11 is a diagram illustrating a virtual image before luminance correction according to a first modification of the embodiment.
Figure 12:
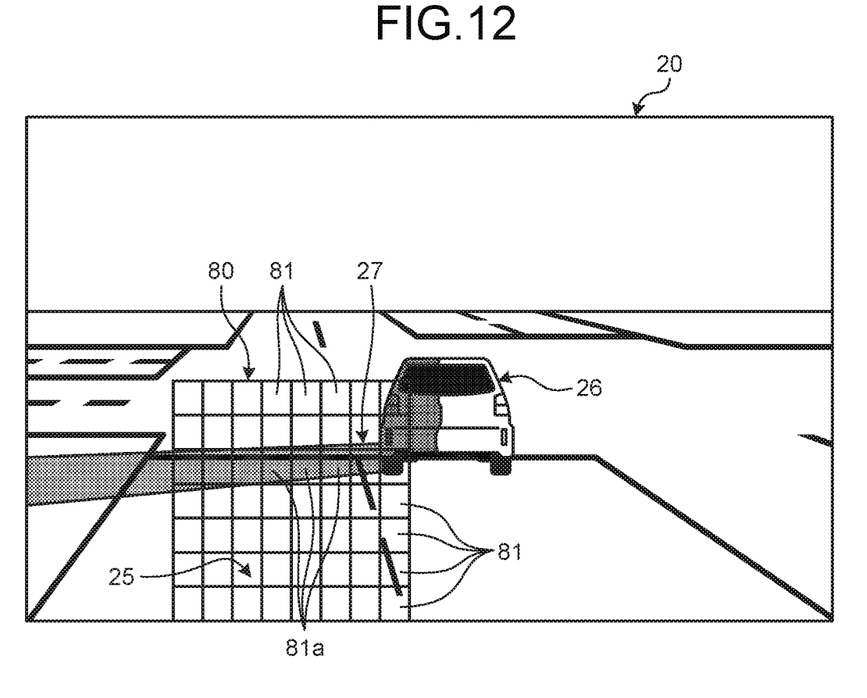
FIG. 12 is a diagram illustrating a target region according to the first modification of the embodiment.
Figure 13:
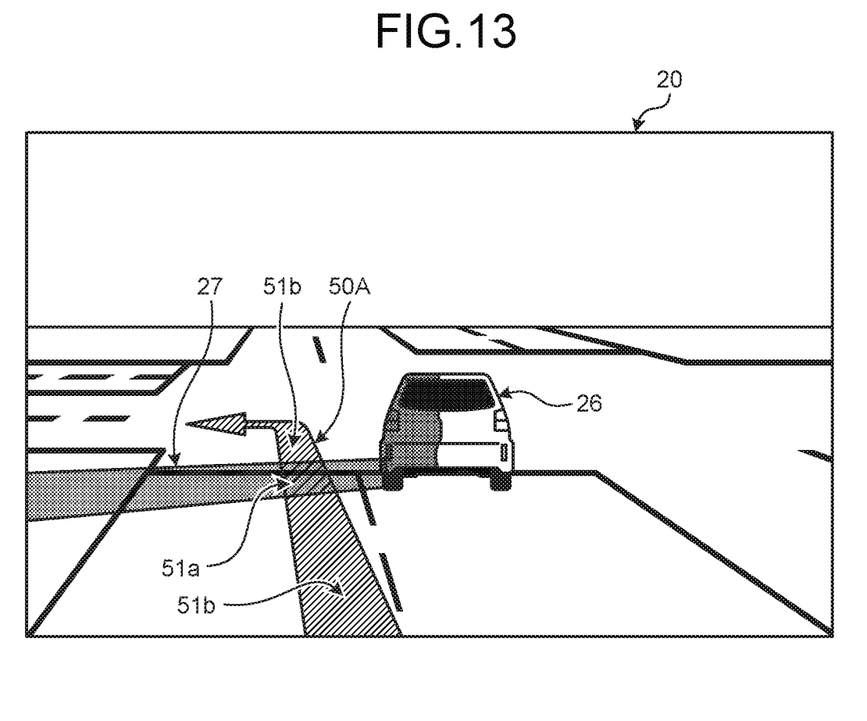
FIG. 13 is a diagram illustrating a virtual image after luminance correction according to the first modification of the embodiment.
Figure 14:
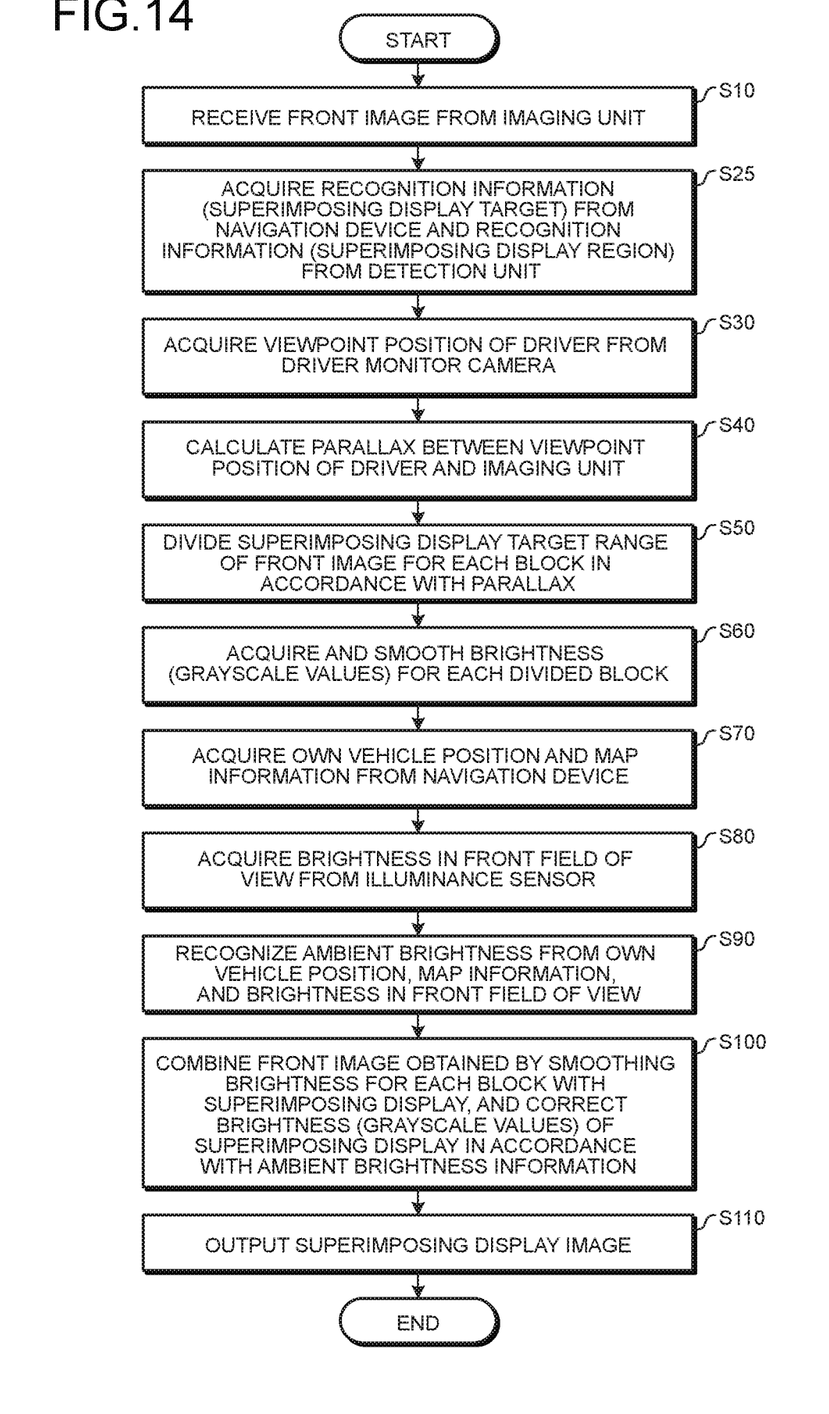
FIG. 14 is a flowchart according to the first modification of the embodiment.

A first modification of the embodiment is described. FIG. 11 is a diagram illustrating a virtual image before luminance correction according to the first modification of the embodiment. FIG. 12 is a diagram illustrating a target region according to the first modification of the embodiment. FIG. 13 is a diagram illustrating a virtual image after luminance correction according to the first modification of the embodiment. FIG. 14 is a flowchart according to the first modification of the embodiment. The first modification of the embodiment is different from the above-mentioned embodiment in that a superimposing display target is a road ahead of the vehicle.

As illustrated in FIG. 11, in the first modification, a superimposing display target is a road surface 25 of a road ahead of the vehicle. A virtual image S displayed while being superimposed on the road surface 25 is an arrow 50 used for route guidance by the navigation device 4. The head-up display device 1 in the first modification displays the arrow 50 such that the arrow 50 is superimposed on the road surface 25 ahead of the vehicle. The arrow 50 in FIG. 11 indicates that the travel direction by route guidance is a left direction in a crossing ahead of the vehicle.

For example, the controller 13 determines a target region 80 as illustrated in FIG. 12 for a front image 20 acquired from the imaging unit 2. The shape of the target region 80 is determined so as to include a display region of the arrow 50. For example, the target region 80 is determined on the basis of map information and information on the current position of the vehicle 100 acquired from the navigation device 4. Note that, in the case where the navigation device 4 stores image data indicating the shape of the crossing when viewed by the driver D, the target region 80 may be determined by pattern matching between the image data and the front image 20.

The target region 80 is divided into a plurality of divided regions 81. For example, the target region 80 is divided into a grid. The controller 13 calculates a representative luminance value BR in each divided region 81 to create a map of a luminance distribution. Based on the map of the luminance distribution, the controller 13 corrects luminance of portions of the arrow 50 that correspond to the divided regions 81. When the representative luminance value BR in a divided region 81 has high luminance, the controller 13 corrects a luminance value BT of a portion of the arrow 50 that is to be superimposed in the divided region 81 to a high luminance side. The luminance value BT may be corrected to a higher luminance side as the representative luminance value BR has higher luminance. On the other hand, when the representative luminance value BR in a divided region 81 has low luminance, the controller 13 corrects a luminance value BT of a portion of the arrow 50 that is to be superimposed in the divided region 81 to a low luminance side. The luminance value BT may be corrected to a lower luminance side as the representative luminance value BR has lower luminance.

As illustrated in FIG. 11 and FIG. 12, a shade 27 of another vehicle 26 extends on the road surface 25. Thus, in divided regions 81a corresponding to the shade 27, the representative luminance values BR have low luminance. FIG. 13 illustrates an arrow 50A after luminance correction. The arrow 50A has a portion 51a having relatively low luminance and portions 50b having relatively high luminance. The portion 51a with low luminance is a portion corresponding to the divided region 81a. The portions 50b with high luminance are portions corresponding to divided regions 81 other than the divided region 81a. A portion of the arrow 50A that is superimposed on the shade 27 is set to have low luminance, and hence the luminance of the arrow 50A is appropriately set.

Referring to the flowchart in FIG. 14, the operation of the head-up display device 1 in the first modification is described. The flowchart in FIG. 14 illustrates a display control method according to the first modification. In the flowchart according to the first modification, Step S25 is provided in place of Step S20 in the above-mentioned embodiment. After a front image is acquired at Step S10, the flow proceeds to Step S25.

At Step S25, the controller 13 acquires recognition information. The controller 13 acquires recognition information on a superimposing display target from the navigation device 4. Examples of the information acquired from the navigation device 4 include information on a road surface 25 that is a superimposing display target and information on the road shape of a crossing ahead of the vehicle 100. The controller 13 may further acquire information on the arrow 50 to be displayed on the road surface 25 ahead of the vehicle 100 from the navigation device 4. The controller 13 acquires recognition information on a superimposing display region from the detection unit 5. Examples of the information acquired from the detection unit 5 include coordinate information on the detected white lines 24 and coordinate information on the road shape in a lane where the vehicle 100 is travelling. The controller 13 sets the target region 80 on the basis of the acquired recognition information. After Step S25 is executed, the flow proceeds to Step S30.

The steps from Step S30 to Step S110 conform to the display control method in the above-mentioned embodiment. At Step S30, the controller 13 acquires a viewpoint position EP of the driver D, and at Step S40, calculates a parallax between the viewpoint position EP and the imaging unit 2. For example, the controller 13 calculates the parallax on the basis of the recognition information on the superimposing display region acquired at Step S25 and the viewpoint position EP acquired at Step S30.

At Step S50, the controller 13 divides the target region 80 into a plurality of divided regions 81 corresponding to the parallax, and at Step S60, calculates a representative luminance value BR for each divided region 81. At Step S70, the controller 13 acquires the own vehicle position and map information from the navigation device 4, and at Step S80, acquires the brightness in a front field of view. At Step S90, the controller 13 recognizes the ambient brightness.

At Step S100, the controller 13 combines the image 20 obtained by smoothing the brightness for each block with a superimposing display. The controller 13 adjusts the luminance value BT of each portion in the arrow 50 on the basis of the representative luminance value BR calculated at Step S60. The controller 13 corrects the luminance level in the entire arrow 50 in accordance with the result of recognizing the ambient brightness. By correcting the luminance at Step S100, a luminance distribution of a corrected arrow 50A is determined. At Step S110, the controller 13 outputs a superimposing display image. The controller 13 controls the display device 11 to display the corrected arrow 50A.

Second Modification of Embodiment

The representative luminance value BR is not limited to an average value of luminances of pixels in a divided region 61. The representative luminance value BR may be a median value or a mode value of luminances of pixels, or may be another value that represents luminances of pixels.

The virtual image S to be displayed in a region superimposed on a superimposing display target is not limited to the exemplified frame 40A. The frame 40A is not necessarily required to be closed. A virtual image S different from the frame 40A may be displayed. For example, the superimposing display target may be surrounded by brackets or a circle instead of the frame 40A, or another rendering for filling the entire superimposing display target is conceivable. In the case of filling the superimposing display target, the superimposing display target may be rendered such that the superimposing display target can be viewed behind the virtual image S. A plurality of virtual images S may be displayed in a region superimposed on a superimposing display target.

Not only the luminance of the frame 40A but also the thickness of the frame 40A may be adjusted. For example, the controller 13 may reduce the thickness of a portion 41 corresponding to a divided region 61 the representative luminance value BR of which has low luminance, and increase the thickness of a portion 41 corresponding to a divided region 61 the representative luminance value BR of which has high luminance.

The target on which the virtual image S is to be superimposed and displayed is not limited to the other vehicle 21. The target to be superimposed and displayed may be persons 22, obstacles such as falling objects on roads including expressways, or other mobile objects, and may be the road surface 23 or the white line 24.

The reflection member configured to reflect light projected by the projection unit 7 toward the driver D is not limited to the windshield 8. The reflection member may be a combiner or other semi-transmissive members.

The projection unit 7 may include, as the display device 11, another display device in place of the liquid crystal display device. For example, a plurality of light sources may be turned on to display the frame 40A by light from the light sources. As the light source, a light emitting diode (LED) may be used.

The adjustment of the sizes of the divided regions 61 and 81 in accordance with the parallax may be performed independently in a vehicle height direction and in a vehicle width direction. For example, at Step S40, the size of the parallax in the vehicle height direction and the size of the parallax in the vehicle width direction are each calculated. The height H1 of the row in the divided region 61 or 81 is adjusted in accordance with the size of the parallax in the vehicle height direction, and the width W1 of the column in the divided region 61 or 81 is adjusted in accordance with the size of the parallax in the vehicle width direction.

The contents disclosed in the above-mentioned embodiment and modifications can be implemented in combination as appropriate.

The head-up display device according to the present embodiments includes: a reflection member disposed in front of a driver who drives a vehicle; a projection unit for projecting light toward the reflection member and displaying a virtual image in a region superimposed on a superimposing display target when viewed by the driver; and an imaging unit for taking an image of a region in front of the vehicle to generate a front image that is an image of the region in front of the vehicle. The projection unit adjusts a luminance distribution of the virtual image in accordance with a luminance distribution of a region of the superimposing display target in the front image. The head-up display device according to the present embodiments exhibits an effect that, by adjusting the luminance distribution of the virtual image in accordance with the luminance distribution of the region of the superimposing display target, appropriate luminance of the virtual image can be set.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A head-up display device, comprising:
   a reflection member disposed in front of a driver who drives a vehicle;
   a projector configured to project light toward the reflection member and display a virtual image in a region superimposed on a superimposing display target that is a detection target in front of the vehicle when viewed from the driver; and
   an imaging unit configured to take an image of a region in front of the vehicle to generate a front image that is an image of the region in front of the vehicle,
   a processor configured to calculate a parallax between a viewpoint position of the driver and a position of the imaging unit, wherein
   a region of the superimposing display target that is the detection target in front of the vehicle is divided into a plurality of divided regions,
   the projector adjusts a luminance distribution of the virtual image that is displayed in the region superimposed on the superimposing display target in accordance with a luminance distribution of a region of the superimposing display target that is the detection target in front of the vehicle in the front image, and adjusts luminance of a portion in the virtual image that corresponds to the divided region in accordance with a luminance value of the divided region, and
   a size of the divided region is changed in accordance with a size of the parallax.

2. The head-up display device according to claim 1, wherein
   when a portion with low luminance is present in a region of the superimposing display target that is the detection target in front of the vehicle, the projector decreases luminance of a portion in the virtual image that corresponds to the portion with low luminance.

3. The head-up display device according to claim 2, wherein
   the superimposing display target is the detection target in front of the vehicle that is detected by a detection unit.

4. The head-up display device according to claim 1, wherein
   the superimposing display target is the detection target in front of the vehicle that is detected by a detection unit.

5. The head-up display device according to claim 4, wherein
   the detection target is a mobile object in front of the vehicle, and
   the virtual image displayed by the projector is a frame surrounding the mobile object.

6. A display control method, comprising:
   an acquisition step of acquiring a front image that is an image of a region in front of a vehicle; and
   a projection step of projecting light toward a reflection member disposed in front of a driver who drives the vehicle, and displaying a virtual image in a region superimposed on a superimposing display target that is a detection target in front of the vehicle when viewed from the driver, wherein
   a region of the superimposing display target that is the detection target in front of the vehicle is divided into a plurality of divided regions,
   in the projecting step, a luminance distribution of the virtual image that is displayed in the region superimposed on the superimposing display target is adjusted in accordance with a luminance distribution of a region of the superimposing display target that is a detection target in front of the vehicle in the front image, and luminance of a portion in the virtual image that corresponds to a divided region is adjusted in accordance with a luminance value of the divided region, and
   a size of the divided region is changed in accordance with a size of a parallax between a viewpoint position of the driver and a position of an imaging unit configured to take the front image.

7. The display control method according to claim 6, wherein
   in the projecting step, when a portion with low luminance is present in the front image, luminance of a portion in the virtual image that corresponds to the portion with low luminance is decreased.

8. The display control method according to claim 7, wherein
   the superimposing display target is the detection target in front of the vehicle that is detected by a detection unit.

9. The display control method according to claim 6, wherein
   the superimposing display target is the detection target in front of the vehicle that is detected by a detection unit.

* * * * *